United States Patent
Avitabile et al.

(10) Patent No.: US 12,235,837 B2
(45) Date of Patent: Feb. 25, 2025

(54) HEDGED READS

(71) Applicant: MongoDB, Inc., New York, NY (US)

(72) Inventors: Therese Avitabile, New York, NY (US); Misha Tyulenev, Brooklyn, NY (US); Jason Carey, Austin, TX (US); Andrew Michalski Schwerin, Brooklyn, NY (US); Ben Caimano, Brooklyn, NY (US); Amirsaman Memaripour, Knoxville, TN (US); Cheahuychou Mao, Brooklyn, NY (US); Jeff Yemin, Wayland, MA (US); Garaudy Etienne, West Orange, NJ (US)

(73) Assignee: MongoDB, Inc., New York, NY (US)

( * ) Notice: Subject to any disclaimer, the term of this patent is extended or adjusted under 35 U.S.C. 154(b) by 149 days.

(21) Appl. No.: 17/341,747

(22) Filed: Jun. 8, 2021

(65) Prior Publication Data

US 2021/0382888 A1    Dec. 9, 2021

Related U.S. Application Data

(60) Provisional application No. 63/036,191, filed on Jun. 8, 2020.

(51) Int. Cl.
*G06F 16/00* (2019.01)
*G06F 16/2453* (2019.01)

(52) U.S. Cl.
CPC .................. *G06F 16/2453* (2019.01)

(58) Field of Classification Search
CPC ............. H04L 43/0864; H04L 41/0253; H04L 41/22; G06F 11/0709; A63F 2300/534; A63F 2300/556; G06N 20/00

USPC ......... 707/602, 704, 764, E17.005, E17.029, 707/E17.135, E17.136, E17.137, E17.14, 707/E17.142

See application file for complete search history.

(56) References Cited

U.S. PATENT DOCUMENTS

| | | | | |
|---|---|---|---|---|
| 5,983,326 | A * | 11/1999 | Hagersten | G06F 12/0828 711/147 |
| 6,401,198 | B1 * | 6/2002 | Harmer | G06F 9/4411 713/1 |
| 7,143,250 | B1 * | 11/2006 | Riedl | G06F 3/0689 710/37 |
| 7,181,438 | B1 * | 2/2007 | Szabo | G06Q 30/0269 705/14.27 |
| 7,692,823 | B2 * | 4/2010 | Minowa | H04N 1/00427 358/474 |
| 8,984,243 | B1 * | 3/2015 | Chen | G06F 3/0631 711/E12.069 |
| 10,601,722 | B2 * | 3/2020 | Chehaibar | H04L 1/188 |
| 10,756,990 | B1 * | 8/2020 | Chakkassery Vidyadharan .......... G06F 11/3419 |
| 10,929,041 | B1 * | 2/2021 | Ping | G06F 11/3034 |

(Continued)

*Primary Examiner* — Tony Mahmoudi
*Assistant Examiner* — Linh Black
(74) *Attorney, Agent, or Firm* — Wolf, Greenfield & Sacks, P.C.

(57) ABSTRACT

Systems and methods are provided for managing read requests in a database system. The same read request is communicated to multiple nodes to reduce long tail latency. If the read request is communicated to two nodes and the first node is experiencing a communication failure, the read request is serviced by the second node. Once a response is received from the second node, the read request to the first node can be canceled.

17 Claims, 8 Drawing Sheets

(56) References Cited

U.S. PATENT DOCUMENTS

| | | | | |
|---|---|---|---|---|
| 11,429,893 B1* | 8/2022 | Tong | | G06N 20/00 |
| 2002/0152303 A1* | 10/2002 | Dispensa | | H04L 41/0213 |
| | | | | 709/224 |
| 2003/0172145 A1* | 9/2003 | Nguyen | | H04L 12/185 |
| | | | | 709/223 |
| 2003/0233445 A1* | 12/2003 | Levy | | H04L 43/0888 |
| | | | | 709/224 |
| 2005/0033758 A1* | 2/2005 | Baxter | | A61K 47/42 |
| 2005/0083834 A1* | 4/2005 | Dunagan | | H04L 12/1895 |
| | | | | 370/221 |
| 2005/0086301 A1* | 4/2005 | Eichler | | H04L 67/38 |
| | | | | 709/204 |
| 2005/0280880 A1* | 12/2005 | Harada | | H04N 1/00588 |
| | | | | 358/498 |
| 2008/0114937 A1* | 5/2008 | Reid | | G06F 11/3636 |
| | | | | 710/22 |
| 2008/0177994 A1* | 7/2008 | Mayer | | G06F 16/00 |
| | | | | 709/224 |
| 2008/0222734 A1* | 9/2008 | Redlich | | H04L 9/3271 |
| | | | | 726/26 |
| 2009/0202176 A1* | 8/2009 | Hwang | | H04N 23/745 |
| | | | | 382/294 |
| 2009/0276771 A1* | 11/2009 | Nickolov | | G06Q 30/04 |
| | | | | 718/1 |
| 2009/0313311 A1* | 12/2009 | Hoffmann | | G06F 11/2097 |
| 2010/0049915 A1* | 2/2010 | Burkey | | G06F 3/0683 |
| | | | | 711/E12.019 |
| 2010/0191884 A1* | 7/2010 | Holenstein | | G06F 11/2094 |
| | | | | 707/613 |
| 2012/0198267 A1* | 8/2012 | Das | | G06F 13/18 |
| | | | | 713/600 |
| 2013/0188496 A1* | 7/2013 | Hong | | H04L 43/0894 |
| | | | | 370/241 |
| 2013/0346281 A1* | 12/2013 | Sutton | | G06Q 40/04 |
| | | | | 705/37 |
| 2015/0002656 A1* | 1/2015 | Dubois | | G01B 11/14 |
| | | | | 348/95 |
| 2015/0032696 A1* | 1/2015 | Camble | | G06F 11/1456 |
| | | | | 707/634 |
| 2016/0182330 A1* | 6/2016 | Iannaccone | | H04L 43/10 |
| | | | | 709/224 |
| 2016/0350392 A1* | 12/2016 | Rice | | G06F 16/27 |
| 2017/0054547 A1* | 2/2017 | Nishimoto | | H04L 12/40 |
| 2017/0277713 A1* | 9/2017 | Strauss | | G06F 16/183 |
| 2017/0277715 A1* | 9/2017 | Strauss | | G06F 16/1865 |
| 2017/0301015 A1* | 10/2017 | Tunnell | | G06Q 40/04 |
| 2018/0139131 A1* | 5/2018 | Ignatchenko | | H04L 45/121 |
| 2018/0270161 A1* | 9/2018 | Popescu | | H04L 43/0864 |
| 2019/0053281 A1* | 2/2019 | Åström | | H04W 72/21 |
| 2019/0066208 A1* | 2/2019 | Agarwal | | G06Q 30/0283 |
| 2020/0007616 A1* | 1/2020 | Shattil | | H04L 67/1021 |
| 2020/0059849 A1* | 2/2020 | Bencheikh | | H04W 40/22 |
| 2020/0184564 A1* | 6/2020 | Lim | | G06Q 40/04 |
| 2020/0243033 A1* | 7/2020 | Slavenburg | | G09G 3/3674 |
| 2020/0244630 A1* | 7/2020 | Swahn | | G06F 21/10 |
| 2020/0382617 A1* | 12/2020 | Trapane | | H04L 67/1023 |
| 2021/0141770 A1* | 5/2021 | Wang | | G06F 16/185 |
| 2021/0142241 A1* | 5/2021 | Thompson | | G06Q 50/30 |
| 2021/0146354 A1* | 5/2021 | Siu | | G11C 13/0019 |
| 2021/0151129 A1* | 5/2021 | Ciesla | | G16B 30/10 |

\* cited by examiner

HEDGED READS

RELATED APPLICATIONS

This application claims the benefit under 35 U.S.C. § 119(e) of U.S. provisional patent application Ser. No. 63/036,191 entitled "HEDGED READS," filed Jun. 8, 2020, which is herein incorporated by reference in its entirety.

FIELD OF THE INVENTION

The present invention relates to management of read operations in database systems.

BACKGROUND

Conventional distributed database architectures manage read operations by communicating read requests to one or more nodes/hosts. A node/host that the read request is communicated to may take a long time to return results, for example, in instances where the node/host is experiencing a communication failure. Conventional systems handle such scenarios by canceling the delayed read request and communicating the read request again to either the same nodes/hosts or different nodes/hosts. Such handling of read requests impacts latency and throughput.

SUMMARY

It is realized that methods and systems are needed to address some of the shortcomings of conventional approaches. In particular, there is a need for a database system that manages read requests while reducing latency. According to some aspects, a database system may be designed to communicate the same read request in parallel to multiple nodes/hosts (also referred to herein as "hedged reads"), awaiting the first available response from one of the nodes/hosts. For example, if the read request is communicated to two nodes and the first node is experiencing a communication failure, the read request is serviced by the second node. Once a response is received from the second node, the read request to the first node can be canceled. Handling read requests in this manner results in 1) reduced latency because the read requests are serviced by nodes that are capable of responding quickly, and 2) efficient utilization of network resources by ensuring that read requests to slower nodes are canceled.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

DETAILED DESCRIPTION

According to one aspect, provided are methods and systems for implementing and/or managing read requests in database systems and architectures described in U.S. application Ser. No. 15/721,176, titled "Large Distributed Database Clustering Systems and Methods," filed Sep. 29, 2017, and U.S. application Ser. No. 12/977,563, entitled "Method and Apparatus for Maintaining Replica Sets," filed Dec. 23, 2020, each of which is incorporated by reference herein in its entirety.

According to some embodiments, a database system may be configured to handle read operations from one or more nodes in response to read requests from client computer systems. The nodes may be configured to respond to the read requests from the client computer systems. The nodes may be configured to respond to the read requests in accordance with a read preference that specifies how read requests are to be routed to the nodes. As explained in detail in U.S. application Ser. Nos. 15/721,176 and 12/977,563, the nodes may be members of a shard/replica set. The read preference may specify a read preference mode that indicates which nodes can service the read requests and in what priority order. Examples of read preference modes include primary, secondary, and nearest. A primary read preference mode directs all read requests to a primary node of a set of nodes. A secondary read preference mode directs read requests to only secondary nodes of the set of nodes. The nearest read preference mode directs read requests to any node (primary or secondary) of the set of nodes whose network latency falls within an acceptable latency window.

Common causes for long tail latency include node failures, interruptions, reduced speed, or failure in node service or network connectivity, and/or other node or connectivity issues. By enabling and communicating hedged read requests, the long tail latencies can be reduced or eliminated.

In some embodiments, hedged read requests may be enabled and performed for any non-primary read preference modes, such as secondary and nearest. The hedged read requests (i.e., overlapping read requests communicated to multiple nodes) may be logged as being part of a single read operation.

In one embodiment, a read request may be hedged or communicated to multiple nodes for the nearest read preference mode by default. The system may determine nodes that are eligible for receiving the read request. In some embodiments, eligible nodes may be determined by determining whether a hedged read operation is enabled for the nodes. Nodes for which the hedged read operation is enabled are determined as eligible nodes. Alternatively or additionally, eligible nodes may be determined by pinging a set of nodes by sending a packet to each of the nodes and determining the ping time or roundtrip time for the packet. Any node with a ping time under a maximum ping time limit may be determined to be an eligible node. The read request may be communicated to two or more of these eligible nodes. When the read request is communicated to multiple eligible nodes, a response received from the first node that services the read request is accepted, and all the other read requests to other nodes are canceled.

Figure 1:
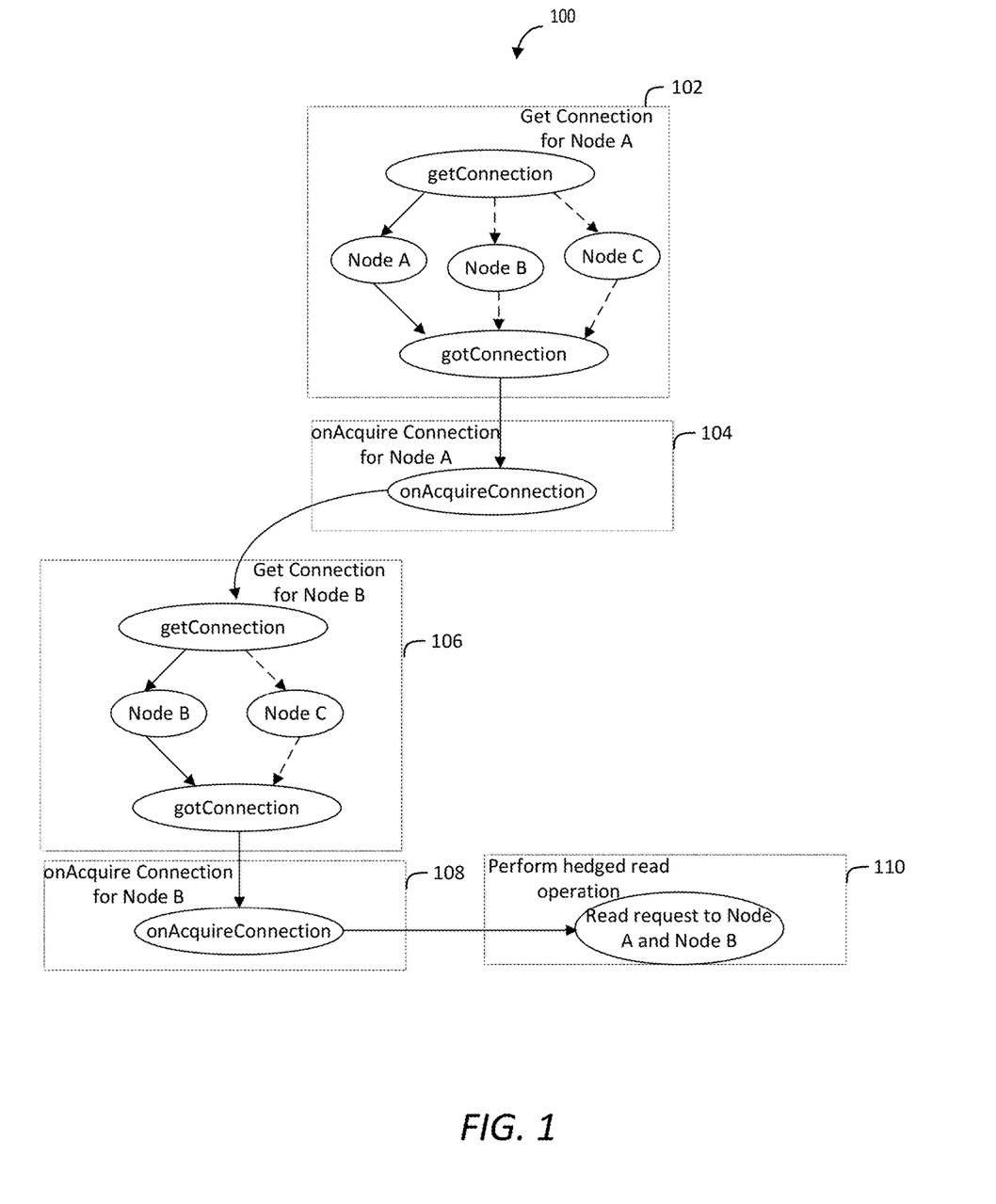
FIG. 1 illustrates an example process flow for managing read requests in a database system, according to some embodiments of the technology described herein.

FIG. 1 illustrates an example process flow 100 for communicating a read request to multiple nodes (i.e., performing hedged read operations), according to aspects of the invention. At 102, for a potential read request, the system is configured to attempt to get/establish a connection for one or more nodes, such as nodes A, B, and/or C. In one embodiment, node A may be designated as a nearest node based on previous attempts or as configured by a user. Nodes B and C may be determined as eligible nodes. As shown in FIG. 1, the connection attempt to node A is successful as indicated by solid arrow to "gotConnection". At 104, upon acquiring the connection to Node A, the system may randomly select one of nodes B and C for the hedged read operation and attempt to get a connection to the selected node. As shown in FIG. 1, at 106, the system may attempt to get a connection to selected node B. The connection attempt to node B is successful as indicated by solid arrow to "gotConnection". At 108, upon acquiring the connection to Node B, the hedged read operation is performed. At 110, the read request is communicated to both node A and node B via their respective connections.

It will be appreciated that while FIG. 1 depicts a sequential approach to establishing connections for nodes A and B, the disclosure is not limited in this respect. For example, connection attempts for both nodes A and B may be made simultaneously. In addition, at 102, prior to attempting to establish connections to the nodes, the system may determine whether a hedged read operation is enabled for each of the nodes (e.g., nodes A, B, and C). In response to a determination that the hedged read operation is enabled for the three nodes, the remaining processes of FIG. 1 may be performed.

Figure 2A:
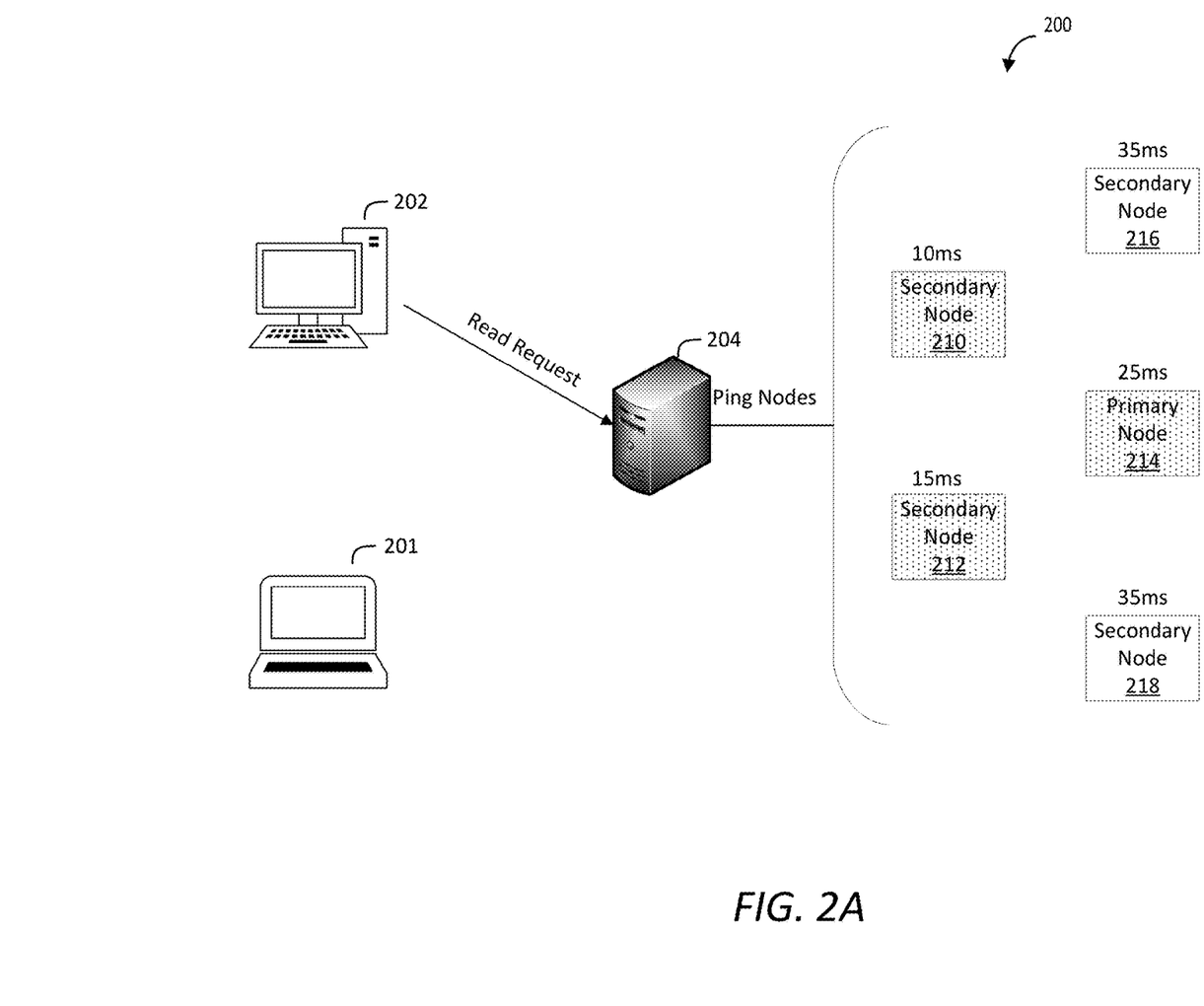
FIG. 2A illustrates an example system 200 for determining eligible nodes, in accordance with some embodiments of the technology described herein.
Figure 2B:
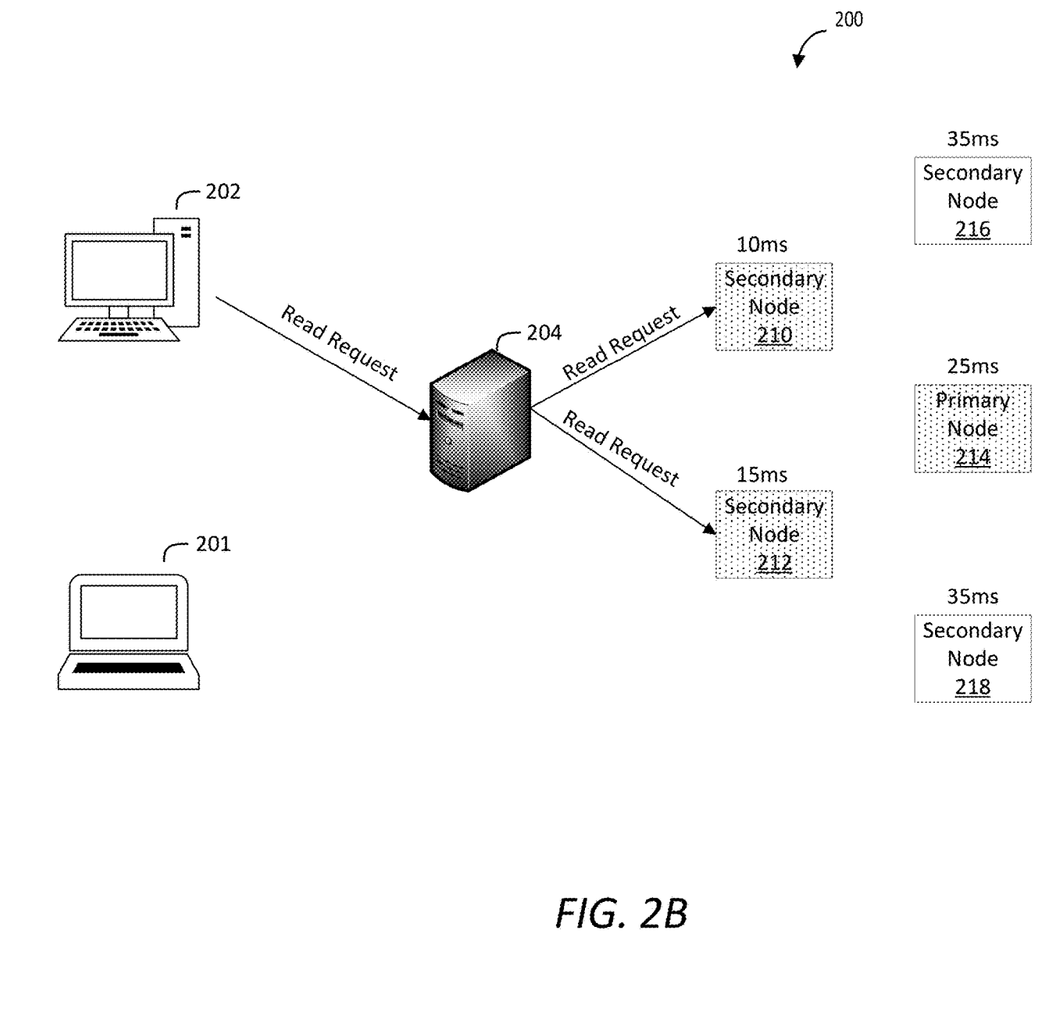
FIG. 2B illustrates an example system 200 for communicating read requests to one or more of the eligible nodes determined in FIG. 2A, in accordance with some embodiments of the technology described herein.

FIGS. 2A-2B illustrate an example system 200 for determining eligible nodes and communicating read requests to one or more of the eligible nodes in accordance with some embodiments. Client systems 201, 202 may communicate read requests to database system 204. Database system 204 may be configured to handle read operations from one or more nodes 210, 212, 214, 216, and 218 in response to the read requests from client systems 201, 202. In some embodiments, in response to receiving a read request from a client system (201, 202), database system 204 may determine whether a hedged read operation is enabled for at least two nodes of the set of nodes 210, 212, 214, 216, and 218.

As shown in FIG. 2A, database system 204 may ping multiple nodes, for example, primary and/or secondary nodes of a shard/replica set. Database system 204 may ping nodes with read preference mode "nearest." In some embodiments, selection of the "nearest" read preference mode indicates that read requests are to be handled with lowest latency available.

In some embodiments, database system 204 may ping nodes 210, 212, 214, 216, and 218 sequentially and determine an average roundtrip time for each node. Database system 204 may ping each of the nodes 210, 212, 214, 216, and 218 as a determination may be made that the hedged read operation is enabled for each node. As shown in FIG. 2A, the average roundtrip time for node 210 is determined as 10 ms, the average roundtrip time for node 212 is determined as 15 ms, the average roundtrip time for node 214 is determined as 25 ms, the average roundtrip time for node 216 is determined as 35 ms, and the average roundtrip time for node 218 is determined as 35 ms. In response to the determined average roundtrip time for each node 210, 212, 214, 216, and 218, a determination may be made that the nearest node with lowest latency/roundtrip time is node 210. The latency associated with node 210 may be used to determine a latency window. In some embodiments, a latency window may be determined by adding a particular threshold value to the lowest roundtrip time. For example, a latency window may be lowest roundtrip time plus a default threshold value of 15 ms (i.e., 10 ms+15 ms=25 ms).

In some embodiments, database system 204 may identify nodes with roundtrip times falling within the latency window. For example, any node with a ping time of 25 ms or less may be identified and determined as an eligible node for hedging. As shown in FIG. 2A, nodes 210, 212, and 214 meet this criterion and may be determined as eligible nodes.

Database system 204 may communicate the read request to two or more of these eligible nodes. In some embodiments, database system 204 may select two of the three eligible nodes randomly and communicate the read request to the selected nodes. As shown in FIG. 2B, database system 204 communicates the read request to nodes 210 and 212.

Figure 3:
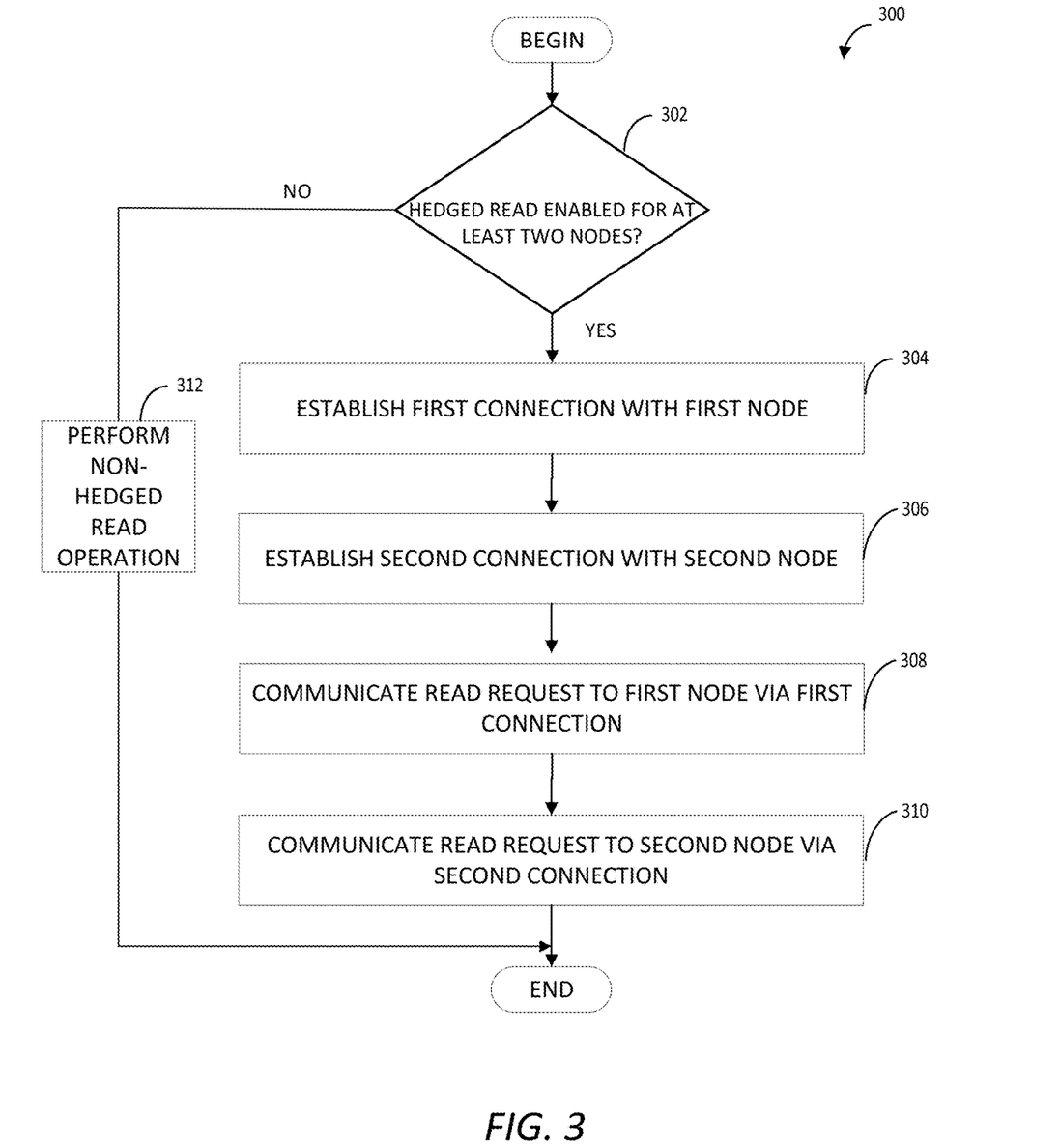
FIG. 3 is a flowchart of an illustrative process 300 for managing hedged read operations in a database system, in accordance with some embodiments of the technology described herein.

FIG. 3 is a flowchart of an illustrative process 300 for managing hedged read operations in a database system, in accordance with some embodiments of the technology described herein. Process 300 may be executed by any suitable database system and, for example, may be executed by database system 204 described with reference to FIGS. 2A-2B.

Process 300 begins at act 302, during which a determination may be made regarding whether a hedged read operation is enabled for at least two nodes of a set of nodes (e.g., nodes 210, 212, 214, 216, and 218 of FIG. 2A). The determination at act 302 may be made in response to receiving a data read request from a client system 201, 202.

In response to a determination that the hedged read operation is enabled for at least two nodes, for example, a first node 210 and a second node 212, acts 304, 306, 308, and/or 310 may be performed. At act 304, a first connection may be established with the first node 210. At act 306, a second connection may be established with the second node 212. At act 308, a read request may be communicated to the first node via the first connection. At act 310, the read request may be communicated to the second node via the second connection.

In some embodiments, in response to a determination that the hedged read operation is not enabled for at least two nodes of the set of nodes, a non-hedged read operation may be performed in act 312. In other words, a hedged read operation may not be performed and, instead, a regular read operation may be performed where the read request is communicated to one of the nodes in the set of nodes.

Figure 4:
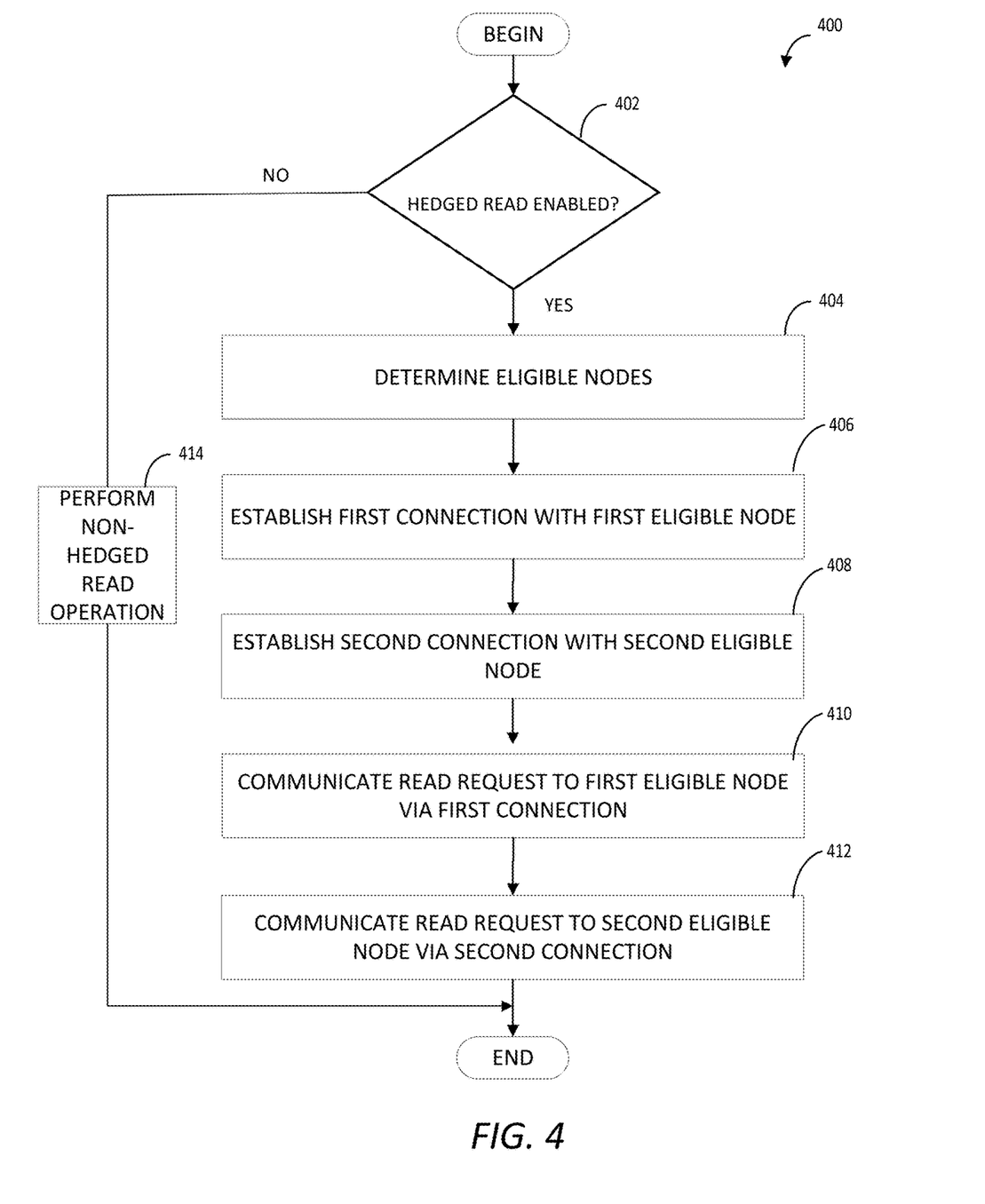
FIG. 4 is a flowchart of an illustrative process 400 for managing hedged read operations in a database system, in accordance with some embodiments of the technology described herein.

FIG. 4 is a flowchart of an illustrative process 400 for managing hedged read operations in a database system, in accordance with some embodiments of the technology described herein. Process 400 may be executed by any suitable database system and, for example, may be executed by database system 204 described with reference to FIGS. 2A-2B.

Process 400 begins at act 402, during which a determination may be made regarding whether a hedged read operation is enabled for at least two nodes of a set of nodes (e.g., nodes 210, 212, 214, 216, and 218 of FIG. 2A). The determination at act 402 may be made in response to receiving a data read request from a client system 201, 202.

In response to a determination that the hedged read operation is enabled for multiple nodes, acts 404, 406, 408, 410, and/or 412 may be performed. At act 404, one or more eligible nodes (i.e., nodes eligible for a hedged read operation) may be determined. Eligible nodes may be determined by pinging the multiple nodes for which hedged read operation is enabled.

At act 406, a first connection may be established with a first eligible node. At act 408, a second connection may be established with a second eligible node. At act 410, a read request may be communicated to the first eligible node via the first connection. At act 412, the read request may be communicated to the second eligible node via the second connection.

In some embodiments, in response to a determination that the hedged read operation is not enabled for at least two nodes of the set of nodes, a non-hedged read operation may be performed at act 414. In other words, a hedged read operation may not be performed and, instead, a regular read operation may be performed where the read request is communicated to one of the nodes in the set of nodes.

In some embodiments, when the read request is communicated to multiple eligible nodes, a response received from the first node that services the read request is accepted, and all the other read requests to other nodes are canceled. For example, if a response is received and accepted from the second node, the read request to the first node may be canceled. In some embodiments, when the read request is communicated to multiple eligible nodes, a unique identifier (e.g., clientOperationKey) is attached to or otherwise associated with each read request communicated to each eligible node. After a response from one of the eligible nodes is received, a cancel or kill command may be communicated to the other nodes indicating that the other read requests with the same unique identifier be canceled.

In some embodiments, database system 204 may ping multiple nodes of a shard/replica set and identify one of the nodes as a nearest node. Database system 204 may identify the nearest node by selecting, from among the multiple nodes, a node with lowest average network round-trip-time (RTT). Database system 204 may make this determination by monitoring server discovery and monitoring (SDAM) events. In some embodiments, database system 204 may determine a latency window by adding the lowest average network RTT to a threshold ping time. A default value for the threshold ping time is 15 ms, however, other values may be selected without departing from the scope of this disclosure. The default value of 15 ms means that any node with a RTT falling within 15 ms of the nearest node is also within the latency window. Database system 204 may identify any nodes with RTTs within the latency window as eligible nodes. Database system 204 may randomly select at least two of the eligible nodes and communicate the read request to these selected nodes.

In some embodiments, a determination may be made regarding whether a hedged read operation can be performed. A determination that a hedged read operation can be performed may be made when the hedged read operation is enabled and/or one or more eligible nodes are determined. On the other hand, a determination that a hedged read operation cannot be performed may be made when the hedged read operation is not enabled and/or one or more eligible nodes cannot be determined.

The various processes described herein can be configured to be executed on the systems shown and described in U.S. application Ser. Nos. 15/721,176 and 12/977,563. The systems and/or system components can be programmed to execute the processes and/or functions described. Additionally, other computer systems can be specially configured to perform the operations and/or functions described herein. For example, various embodiments according to the present invention may be implemented on one or more computer systems. These computer systems may be, specially configured, general-purpose computers such as those based on Intel Atom, Core, or PENTIUM-type processor, IBM PowerPC, AMD Athlon or Opteron, Sun UltraSPARC, or any other type of processor. It should be appreciated that one or more of any type computer system may be used to host a database, a database replica, a database partition, a database shard, a database chunk and perform functions associated replica sets, data partitions, and shards as described in U.S. application Ser. Nos. 15/721,176 and 12/977,563. Further, the computer systems can be configured to execute the processes discussed above for performing hedged read operations. Additionally, any system may be located on a single computer or may be distributed among a plurality of computers attached by a communications network.

A general-purpose computer system can be specially configured as disclosed herein. According to one embodiment of the invention the general-purpose computer system is configured to perform any of the described operations and/or algorithms, including but not limited to providing for processing read requests at various nodes, determining whether hedged read operations are enabled for the nodes, identifying nodes that are eligible for hedged read operations, attempting to establish connections with nodes, communicating the same read request to multiple nodes, among other options. The operations and/or algorithms described herein can also be encoded as software executing on hardware that define a processing component, that can define portions of a general-purpose computer, reside on an individual general-purpose computer, and/or reside on multiple general-purpose computers.

Figure 5:
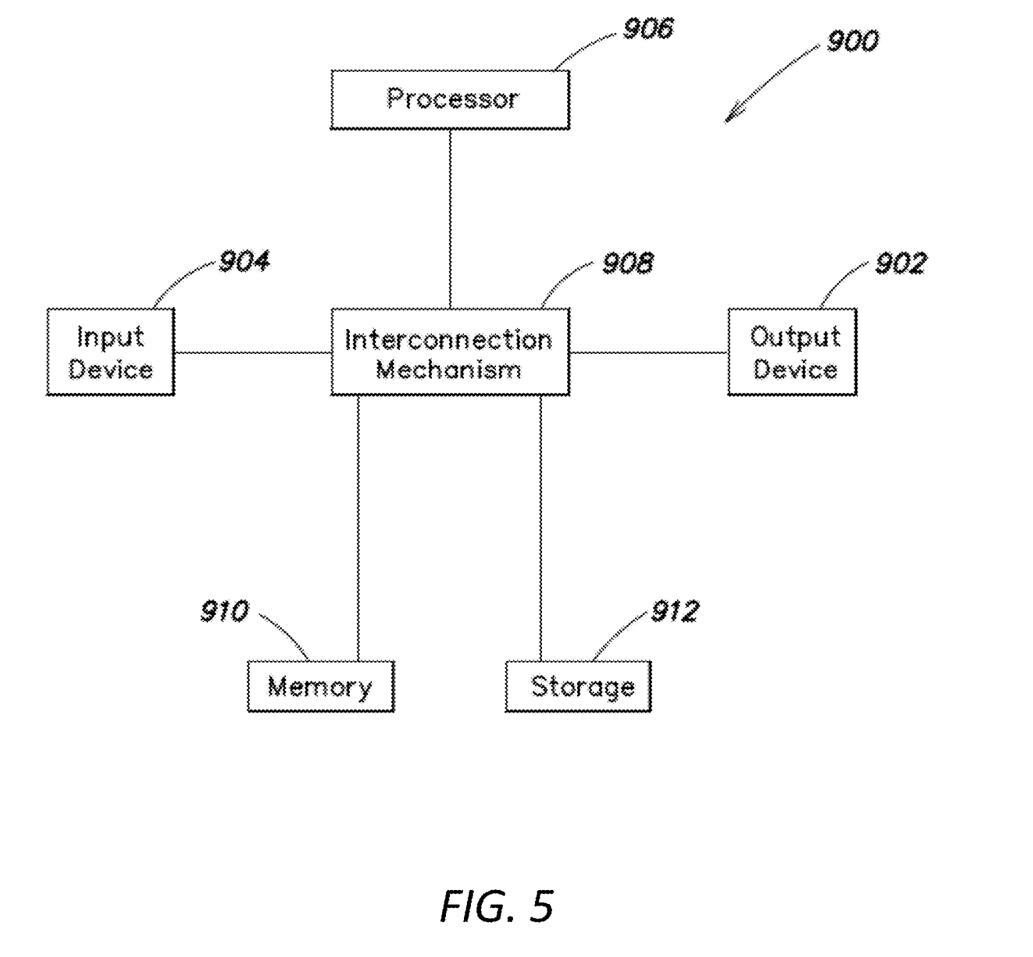
FIG. 5 is a block diagram of an example database system on which various aspects of the technology described herein can be practiced.

FIG. 5 shows a block diagram of an example general-purpose computer system 900 on which various aspects of the present invention can be practiced. For example, various aspects of the invention can be implemented as specialized software executing in one or more computer systems including general-purpose computer systems 1104, 1106, and 1108 communicating over network 1102 shown in FIG. 7. Computer system 900 may include a processor 906 connected to one or more memory devices 910, such as a disk drive, memory, or other device for storing data. Memory 910 is typically used for storing programs and data during operation of the computer system 900. Components of computer system 900 can be coupled by an interconnection mechanism 908, which may include one or more busses (e.g., between components that are integrated within a same machine) and/or a network (e.g., between components that reside on separate discrete machines). The interconnection mechanism enables communications (e.g., data, instructions) to be exchanged between system components of system 900.

Computer system 900 may also include one or more input/output (I/O) devices 902-904, for example, a keyboard, mouse, trackball, microphone, touch screen, a printing device, display screen, speaker, etc. Storage 912, typically includes a computer readable and writeable nonvolatile recording medium in which computer executable instructions are stored that define a program to be executed by the processor or information stored on or in the medium to be processed by the program.

Figure 6:
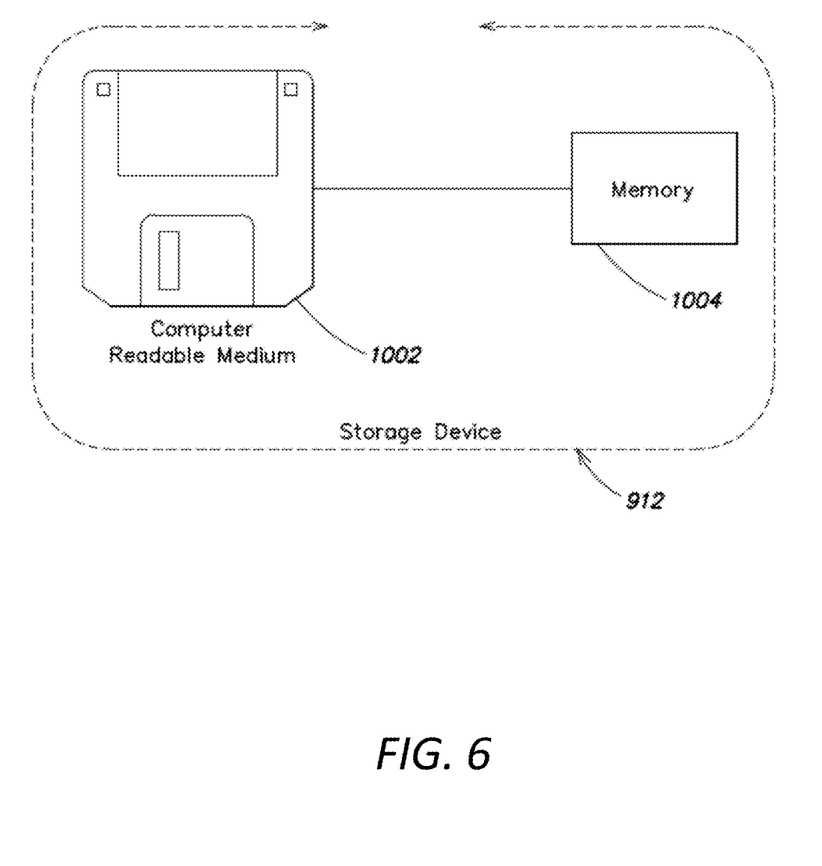
FIG. 6 is a block diagram of an example database system on which various aspects of the technology described herein can be practiced.

The medium can, for example, be a disk 1002 or flash memory as shown in FIG. 6. Typically, in operation, the processor causes data to be read from the nonvolatile recording medium into another memory 1004 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 5, the memory can be located in storage 912 as shown, or in memory system 910. The processor 906 generally manipulates the data within the memory 910, and then copies the data to the medium associated with storage 912 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 900 is shown by way of example, as one type of computer system upon which various aspects of the invention can be practiced, it should be appreciated that aspects of the invention are not limited to being implemented on the computer system as shown in FIG. 5. Various aspects of the invention can be practiced on one or more computers having a different architectures or components than that shown in FIG. 5.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, Ada, or C# (C-Sharp). Other object-oriented programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

Various aspects of this invention can be implemented by one or more systems similar to system 900. For instance, the system can be a distributed system (e.g., client server, multi-tier system) comprising multiple general-purpose computer systems. In one example, the system includes software processes executing on a system associated with hosting database services, processing operations received from client computer systems, interfacing with APIs which receive and process client requests, interfacing with driver operations, performing operations associated with various nodes, for example.

The systems can be distributed among a communication system such as the Internet. One such distributed network, as discussed below with respect to FIG. 7, can be used to implement various aspects of the invention.

Figure 7:
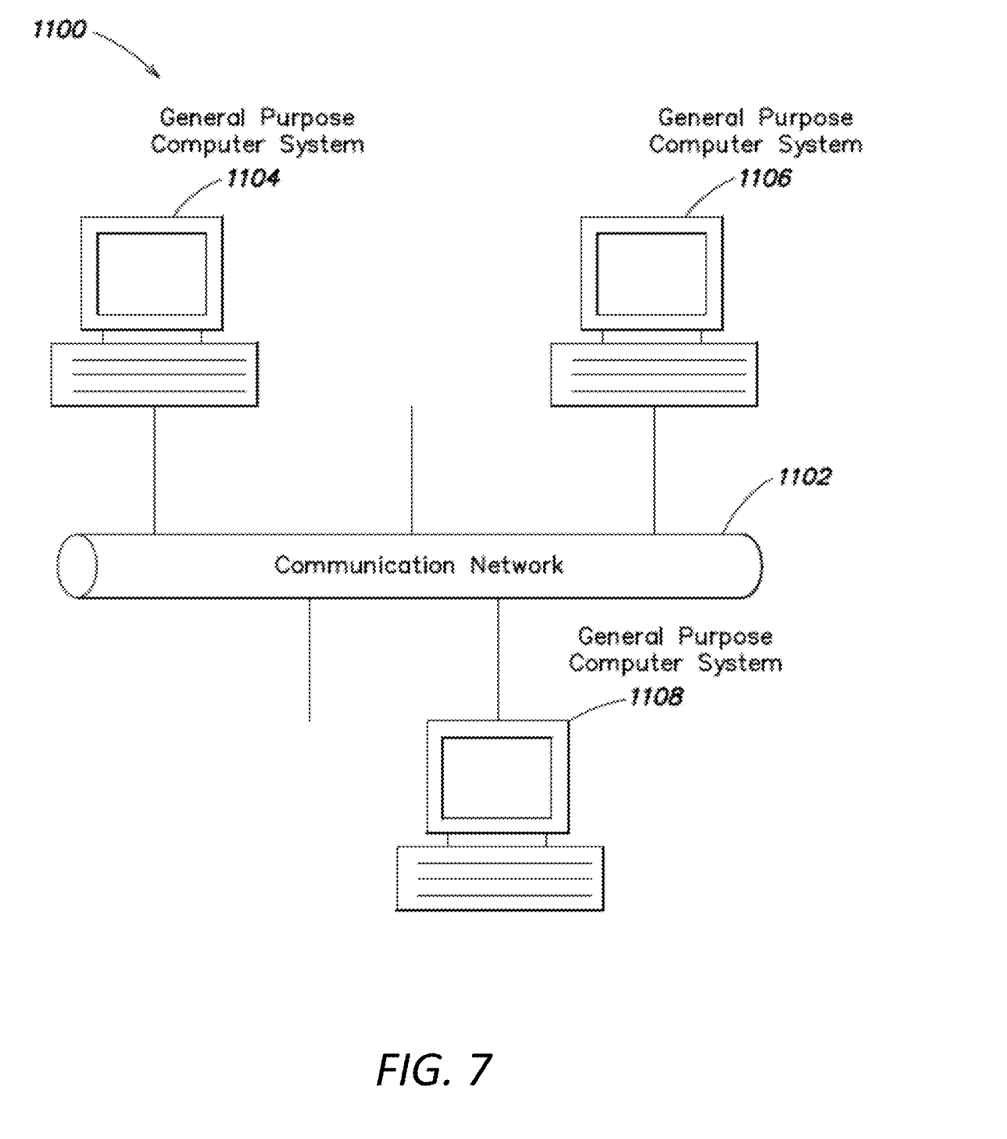
FIG. 7 is a block diagram of an example database system on which various aspects of the technology described herein can be practiced.

FIG. 7 shows an architecture diagram of an example distributed system 1100 suitable for implementing various aspects of the invention. It should be appreciated that FIG. 7 is used for illustration purposes only, and that other architectures can be used to facilitate one or more aspects of the invention.

System 1100 may include one or more specially configured general-purpose computer systems distributed among a network 1102 such as, for example, the Internet. Such systems may cooperate to perform the various functions and processes described herein. In an example of one such system, one or more computer systems 1104, 1106, and 1108 are configured to be nodes in a replica set. The replica set is configured to respond to client requests, such as read requests, for database access. In one setting, access to the database occurs through various APIs and associated drivers. In one example, client computer systems can interface with computer systems 1104-1108 via an Internet-based interface.

In another example, a system 1104 can be accessed through a browser program such as the Microsoft Internet Explorer application program, Mozilla's FireFox, or Google's Chrome browser through which one or more websites can be accessed. Further, there can be one or more application programs that are executed on system 1104 that perform functions associated with responding to client interactions. For example, system 1104 may respond to a read request by returning results from a first node (of a number of nodes that the read request was communicated to) that provided a response to the read request.

Network 1102 may also include, as part of a system for managing read requests, one or more server systems, which can be implemented on general-purpose computers that cooperate to perform various functions and processes described herein. System 1100 may execute any number of software programs or processes on various hardware and the invention is not limited to any particular type or number of processes. Such processes can perform the various workflows associated with a system for managing read requests.

Certain implementations of database systems can employ any number of the following elements. Each of the elements can be configured to perform the listed functions individually collectively and in various combinations.

In one embodiment, a database system, such as a MONGODB™ database (a well-known cross-platform document-oriented database), can be configured to perform one or more of the following processes/functions:

Hedged read, where the same read request is dispatched to multiple nodes or replica set members  Monitoring replica sets and selecting eligible nodes based on read preference, where the read preference is an argument to an operation that specifies which replica members can service the request in what priority order; a read preference mode is a dynamic specifier describing which nodes are eligible for a read, such as, primary, secondary, nearest, etc.

Simultaneous dispatch involving sending all read requests at the same time at the beginning of execution Implement hedging: when a read is "hedged," it uses server selection logic to generate a list of eligible nodes, gather appropriate sockets, and dispatch read requests to two or more of the eligible nodes Provide per operation explicit access to the above "hedging" API via a new readPreference key "hedge" with one subkey:
  Optional: enabled (default true)—This enables hedging
  The explicit opt in is accessible with any read preference except for readPreference "primary" (since there is one eligible node in this case)
  Syntax for an updated readPreference document with explicit hedging parameters is shown below:

```
{
  mode: "nearest"
  hedge: {
    enabled: true,     // optional, defaults to true; hedged read may
                       be enabled by default for "nearest" read
                       preferences
  }
}
db.collection.find( { } ).readPref(
    "secondary",       // mode
    null               //tag set
    {enabled:true}     // hedge options; hedged read may be
                       enabled for non-primary read preferences
)
```

Provide runtime or server parameter for enabling and disabling hedging—setParameter "readHedgingMode" with 2 valid values:
  DEFAULT—"on"—read hedging is available and "nearest" queries opt in as described above
  "off"—read hedging is unavailable. i.e. "nearest" queries will not hedge reads and an explicit read preference request to hedge will be ignored
  Syntax for runtime setParameter to control the read hedging mode is shown below:
    mongos —-setParameter readHedgingMode=on Cancel operations and retain connections for hedged reads that return after the first successful response. In some embodiments, although some of read requests may be canceled, the connections established for communicating the read requests may be retained for performing other tasks/operations (e.g., other read operations or write operations). Since it is expensive to establish connections, the connections may be retained (not closed) until they can be used for other tasks and/or subsequent hedging operations.

Deliver "hedged reads" in sharding by introducing the ability to dispatch multiple overlapping reads, targeting different eligible members/nodes of a replica set, as part of a single read operation. Access this functionality either explicitly, through a new sub document in read preference, or implicitly, by using the read preference mode "nearest"

"Hedge" an operation to cut off long tail latency that might be incurred by any particular read (when a disk is slow, a node goes down, there's a network blip, etc.), by putting another read in flight before the disposition of the first is known. Such events may be rare, and so dispatching a second read will often be able to finish before the first returns Providing a configurable maxTimeMS parameter that represents a time frame (in milliseconds) that the system will wait to find out if a response to a read request came back to determine whether the read request is to be canceled. In some embodiments, the maxTimeMS may be set to 10 ms, although other values can be set without departing from the scope of this disclosure Providing Server Status metrics to detect the efficiency of hedging "hedgingMetrics"
  numTotalOperations: NumberLong
    A count of all operations with readPreference options such that they could be hedged
  numTotalHedgedOperations: NumberLong
    A count of all operations that actually dispatched an additional remote procedure call (RPC)
  numAdvantageouslyHedgedOperations: NumberLong
    A count of all operations where a RPC other than the first one fulfilled the client request

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented method for managing hedged read operations in a database system, the method comprising:
  dynamically determining, responsive to a read request received from a client system, whether a hedged read operation is enabled for each node of a set of nodes hosting target data for servicing the read request, wherein dynamically determining whether the hedged read operation is enabled for each node of the set of nodes comprises:
    determining a read preference mode for servicing the read request, wherein the read preference mode indicates which nodes of the set of nodes can service read requests received from the client system, wherein the read preference mode comprises one of a first read preference mode indicating that a primary node can service the read requests, a second read preference mode indicating that only secondary nodes can service the read requests, and a third read preference mode indicating that any primary or secondary node whose network latency falls within a first latency window can service the read requests, and
    determining whether the hedged read operation is enabled for the determined read preferences mode, wherein determining whether the hedged read operation is enabled comprises determining that the hedged read operation is enabled when the determined read preference mode is either the second read preference mode or the third read preference mode; and in response to a determination that the hedged read operation is enabled for multiple nodes of the set of nodes hosting the target data for the read request:
determining one or more eligible nodes for the hedged read operation at least in part by pinging the multiple nodes of the set of nodes for which the hedged read operation is determined to be enabled, wherein determining the one or more eligible nodes comprises:
determining a lowest average roundtrip time based on pinging the multiple nodes;
determining a second latency window based on the lowest average roundtrip time;
identifying a first node of the set of nodes with a first average roundtrip time within the determined second latency window as a first eligible node for the hedged read operation; and
identifying a second node of the set of nodes with a second average roundtrip time within the determined second latency window as a second eligible node for the hedged read operation;
establishing a first connection with the first eligible node and a second connection with the second eligible node; and
communicating the read request to both the first and second eligible nodes at least in part by:
communicating the read request to the first eligible node via the first connection, and
communicating the read request to the second eligible node via the second connection.

2. The computer-implemented method of claim 1, further comprising:
associating a unique identifier with the read request communicated to the first eligible node and the read request communicated to the second eligible node;
accepting a response received from one of the first eligible node or the second eligible node that services the read request, and
canceling the read request to the other one of the first eligible node or the second eligible node, wherein canceling the read request comprises issuing a command to the other one of the first eligible node or the second eligible node indicating that the read request with the unique identifier be canceled.

3. The computer-implemented method of claim 1, further comprising:
determining whether to cancel the read request based on a determination of whether the response from one of the first eligible node or the second eligible node is received within a configurable time period.

4. The computer-implemented method of claim 1, further comprising:
determining a third average roundtrip time for a third node of the set of nodes; and
identifying the third node of the set of nodes with the third average roundtrip time within the determined second latency window as a third eligible node for the hedged read operation.

5. The computer-implemented method of claim 4, further comprising:
selecting, from among the first, second, and third eligible nodes, the first eligible node and the second eligible node for the hedged read operation.

6. A database system comprising:
at least one processor; and
at least one non-transitory computer-readable storage medium storing instructions that when executed by the at least one processor cause the at least one processor to:
dynamically determine, responsive to a first read request received from a client system, whether a hedged read operation is enabled for each node of a set of nodes hosting target data for servicing the first read request, wherein dynamically determining whether the hedged read operation is enabled for each node of the set of nodes comprises:
determining a read preference mode for servicing the first read request, wherein the read preference mode indicates which nodes of the set of nodes can service read requests received from the client system, wherein the read preference mode comprises one of a first read preference mode indicating that a primary node can service the read requests, a second read preference mode indicating that only secondary nodes can service the read requests, and a third read preference mode indicating that any primary or secondary node whose network latency falls within a first latency window can service the read requests, and
determining whether the hedged read operation is enabled for the determined read preferences mode, wherein determining whether the hedged read operation is enabled comprises determining that the hedged read operation is enabled when the determined read preference mode is either the second read preference mode or the third read preference mode;
in response to a determination that the hedged read operation is enabled for multiple nodes of the set of nodes hosting the target data for servicing the first read request:
determine one or more eligible nodes for the hedged read operation at least in part by pinging the multiple nodes of the set of nodes for which the hedged read operation is determined to be enabled, wherein determining the one or more eligible nodes comprises:
determining a lowest average roundtrip time based on pinging the multiple nodes;
determining a second latency window based on the lowest average roundtrip time;
identifying a first node of the set of nodes with a first average roundtrip time within the determined second latency window as a first eligible node for the hedged read operation; and
identifying a second node of the set of nodes with a second average roundtrip time within the determined second latency window as a second eligible node for the hedged read operation;
establish a first connection with the eligible first node and a second connection with the second eligible node; and
communicate the first read request to both the first and second eligible nodes at least in part by:
communicating the first read request to the first eligible node via the first connection, and
communicating the first read request to the second eligible node via the second connection.

7. The database system of claim 6, wherein:
the database system stores data, and
the set of nodes comprise at least one primary node and a plurality of secondary nodes configured to host the data and manage replication of the data.

8. The database system of claim 6, wherein the instructions further cause the at least one processor to:
dynamically determine, responsive to a second read request received from the client system, whether the hedged read operation is enabled for each node of the set of nodes, and
in response to a determination that the hedged read operation is not enabled for at least two nodes:
perform a non-hedged read operation by communicating the second read request to one of the nodes in the set of nodes.

9. The database system of claim 6, wherein the instructions further cause the at least one processor to:
associate a unique identifier with the first read request communicated to the first eligible node and the read request communicated to the second eligible node;
accept a response received from one of the first eligible node or the second eligible node that services the first read request, and
cancel the first read request to the other one of the first eligible node or the second eligible node, wherein canceling the first read request comprises issuing a command to the other one of the first eligible node or the second eligible node indicating that the first read request with the unique identifier be canceled.

10. The database system of claim 9, wherein the instructions further cause the at least one processor to:
determine whether to cancel the first read request based on a determination of whether the response from one of the first eligible node or the second eligible node is received within a configurable time period.

11. The database system of claim 6, wherein the instructions further cause the at least one processor to:
determine a third average roundtrip time for a third node of the set of nodes; and
identify the third node of the set of nodes with the third average roundtrip time within the determined second latency window as a third eligible node for the hedged read operation.

12. The database system of claim 11, wherein the instructions further cause the at least one processor to:
select, from among the first, second, and third eligible nodes, the first eligible node and the second eligible node for the hedged read operation.

13. At least one non-transitory computer readable storage medium comprising instructions, that when executed by at least one processor, cause the at least one processor to perform:
dynamically determine, responsive to a read request received from a client system, whether a hedged read operation is enabled for each node of a set of nodes hosting target data for servicing the read request, wherein dynamically determining whether the hedged read operation is enabled for each node of the set of nodes comprises:
determining a read preference mode for servicing the read request, wherein the read preference mode indicates which nodes of the set of nodes can service read requests received from the client system, wherein the read preference mode comprises one of a first read preference mode indicating that a primary node can service the read requests, a second read preference mode indicating that secondary nodes can service the read requests, and a third read preference mode indicating that any primary or secondary node whose network latency falls within a first latency window can service the read requests, and
determining whether the hedged read operation is enabled for the determined read preferences mode, wherein determining whether the hedged read operation is enabled comprises determining that the hedged read operation is enabled when the determined read preference mode is either the second read preference mode or the third read preference mode; and
in response to a determination that the hedged read operation is enabled for multiple nodes of the set of nodes:
determine one or more eligible nodes for the hedged read operation at least in part by pinging the multiple nodes of the set of nodes for which the hedged read operation is determined to be enabled, wherein determining the one or more eligible nodes comprises:
determining a lowest average roundtrip time based on pinging the multiple nodes;
determining a second latency window based on the lowest average roundtrip time;
identifying a first node of the set of nodes with a first average roundtrip time within the determined second latency window as a first eligible node for the hedged read operation; and
identifying a second node of the set of nodes with a second average roundtrip time within the determined second latency window as a second eligible node for the hedged read operation; and
establish a first connection with the first eligible node and a second connection with the second eligible node; and
communicate the read request to both the first and the second eligible nodes at least in part by:
communicating the read request to the first eligible node via the first connection, and
communicating the read request to the second eligible node via the second connection.

14. The at least one non-transitory computer readable storage medium of claim 13, wherein the instructions further cause the at least one processor to:
accept a response received from one of the first eligible node or the second eligible node that services the read request, and
cancel the read request to the other one of the first eligible node or the eligible second node.

15. The at least one non-transitory computer readable storage medium of claim 14, wherein the instructions further cause the at least one processor to:
associate a unique identifier with the read request communicated to the first eligible node and the read request communicated to the second eligible node,
wherein canceling the read request comprises issuing a command to the other one of the first eligible node or the second eligible node indicating that the read request with the unique identifier be canceled.

16. The at least one non-transitory computer readable storage medium of claim 13, wherein the instructions further cause the at least one processor to:
identify a third node of the set of nodes with a third average roundtrip time associated with the third node within the second latency window as a third eligible node for the hedged read operation.

17. The at least one non-transitory computer-readable storage medium of claim 16, wherein the instructions further cause the at least one processor to:
  select, from among the first, second, and third eligible nodes, the first eligible node and the second eligible node for the hedged read operation.

* * * * *